June 23, 1970　　　F. R. BONHOMME　　　3,517,374
ELECTRIC CONTACTS

Filed April 9, 1968　　　　　　　　　4 Sheets-Sheet 1

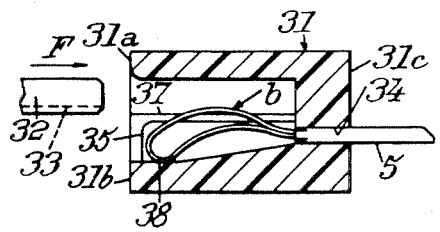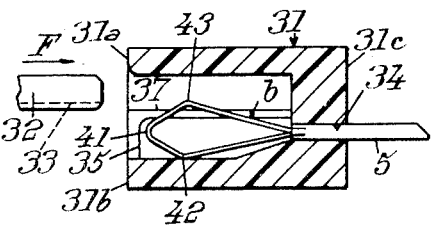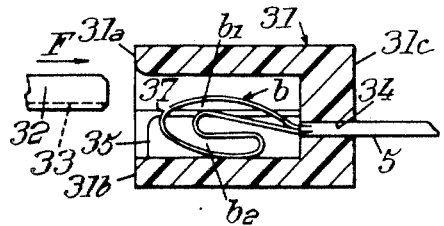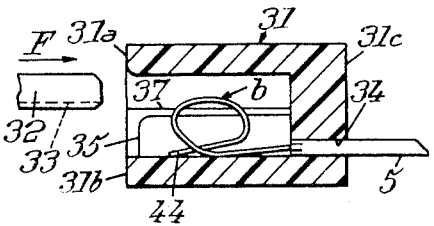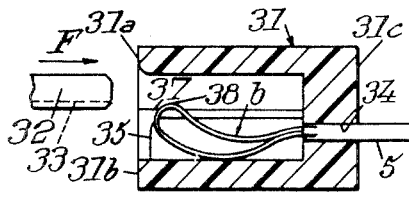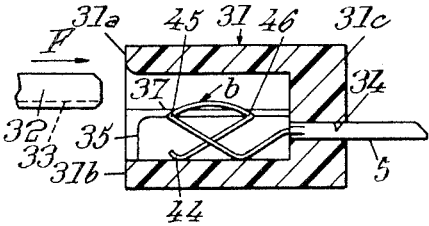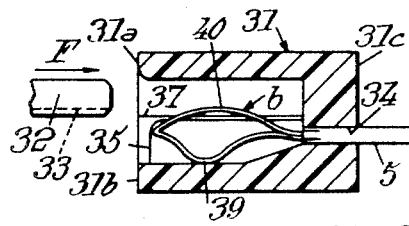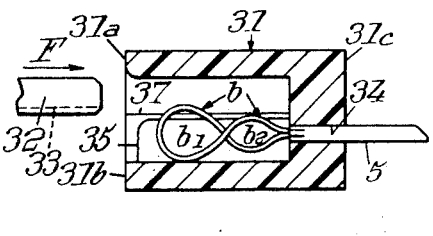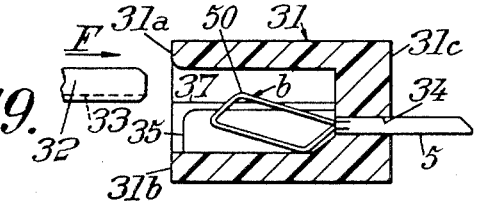

United States Patent Office 3,517,374
Patented June 23, 1970

3,517,374
ELECTRIC CONTACTS
Francois Robert Bonhomme, Courbevoie, France, assignor to Connectronics Corporation, New York, N.Y.
Continuation-in-part of application Ser. No. 513,271, Dec. 13, 1965. This application Apr. 9, 1968, Ser. No. 719,993
Claims priority, application France, Dec. 18, 1964, 999,263
Int. Cl. H01r 33/76, 13/06
U.S. Cl. 339—176                     27 Claims

ABSTRACT OF THE DISCLOSURE

A contact arrangement for printed circuits, the arrangement including connector elements having a plurality of separate similar loops of a conductive resilient metal wire. These loops are juxtaposed to form an elongated composite loop, and the composite loop is widest at its middle portion and has convergent end portions. The connector elements are mounted in alignment and covered by a member adapted to receive a printed circuit board.

This application is a continuation-in-part of application Ser. No. 513,271 filed Dec. 13, 1965, now abandoned.

SUMMARY

An electrical connector in accordance with this invention comprises at least one contact structure which includes a plurality of separate juxtaposed similar elementary loops of an electrically conductive resilient metal wire, aligned to form a composite loop. The elementary loops are each elongated in a first direction and have convergent end portions and are widest at a middle portion between these end portions, so that the composite loop likewise has convergent end portions and is widest at a middle portion between its end portions. The composite loop is secured at one of its end portions to a conductor, in extension of this conductor, by connecting means.

Preferably means are provided for holding the elementary loops together.

This invention is particularly suitable for connecting a plane printed circuit board or card, by making electrical contact either with only a single side of the board or card or with both sides. For this purpose an element is provided, having a housing for receiving such a board or card, and a plurality of composite loops are disposed in individual housings or receptacles in this element.

BRIEF DESCRIPTION OF THE DRAWING

FIG. 11 is a sectional view of an electrical connector according to the present invention, before engagement of the printed circuit board;

FIGS. 12–19, inclusive, are views similar to FIG. 11 relating to eight other embodiments of the invention;

DETAILED DESCRIPTION

The present invention relates to deformable electrical contact arrangements and, more particularly, to electrical connectors intended to insure electrical contact with an electricity conducting surface carried by another element such as a printed circuit board.

An object of the present invention is to provide an electrical contact which is better adapted to meet the requirements of practice than those existing at the present time.

A deformable electric contact according to the invention is constituted by at least one resilient metal wire loop carried by a connector element, one end of said loop being secured in a sleeve or the like on said element, the greater dimension of this loop generally constituting an extension of said connector element.

Preferred and illustrative embodiments of the present invention will next be described with reference to the appended drawing.

The deformable electric contacts shown in FIGS. 1–5 comprise at least one loop $b$ of a wire of an electrically conductive resilient metal, at least one of the two otherwise free ends of said loop being fixed in socket 5, said loop being elongated in extension of socket 5.

According to a first group of embodiments of the invention, the deformable electric contact consists of several oval-shaped loops $b$ of a resilient metal wire, the ends $4a$ and $4b$ of said loop being engaged in socket 5. Said loops are parallel to one another so as to form a composite loop B of elongated shape, the transverse dimension of said loop B being indicated at E.

If an external element were to be engaged by insertion of the illustrated structure, loop B is compressed, points $B_1$ and $B_2$ being then in contact, respectively, with an electrically conducting surface carried by said external element. This compression of loops $b$ insures a good electrical contact between said loops and said conducting surfaces. According to a preferred embodiment of the invention, contact element 1 has each of its three loops constituted by an electric wire of a resilient metal permanently bent at 3.

Owing to this construction, the transverse resiliency of the oval-shaped loop is very great and therefore the electrical contacts along said loop do not result in wear due to mechanical friction of the conducting surface with which loop B is engaged. This advantage is particularly important when said second element is a printed circuit card the conducting surface of which consists of a relatively thin electrolytic deposit.

Figure 1:
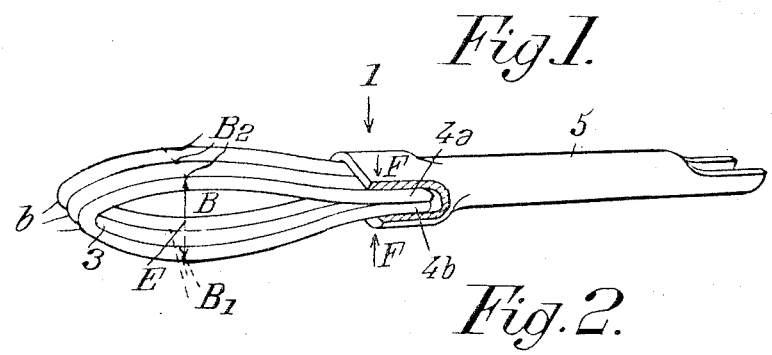
FIG. 1 is a perspective view of an electric contact used in a contact arrangement according to one embodiment of the present invention.

In the embodiment of the invention illustrated by FIG. 1, socket 5 consists of a cylindrical tube the left end of which is flattened and forms a socket in which are inserted the ends $4a$ and $4b$ of the loop. These ends $4a$ and $4b$ are fixed in tube 5 by further flattening of the left end thereof in the direction of arrows F. Electric wires are fixed by welding to the right hand end of tube 5.

Loop $b$ may be made of wires of a metal or an alloy such as phosphorous bronze or beryllium copper, whereas tube 5 is, for instance, a deformable metal or alloy such as brass. The diameter of these wires generally ranges from 0.05 to 0.4 mm.

Figure 2:
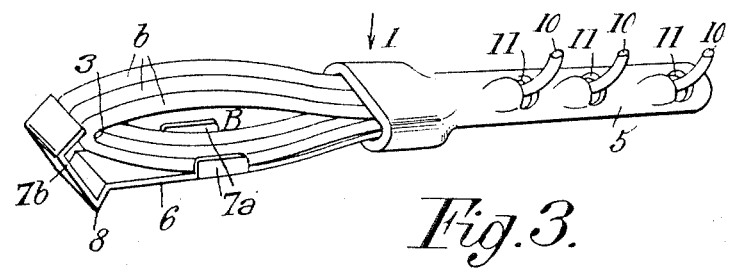
FIGS. 2–5 are views similar to FIG. 1 of further contacts useful in additional embodiments of the invention.
Figure 3:
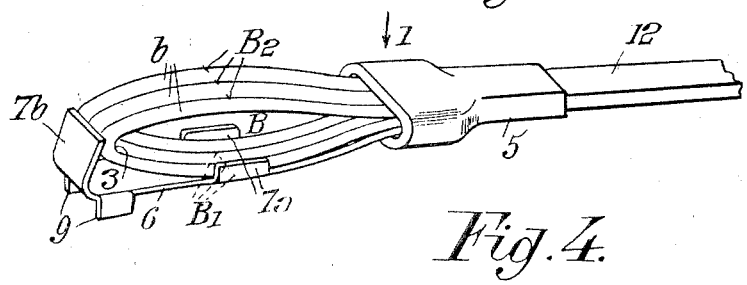

In the examples illustrated by FIGS. 2 and 3, the electric contact element is still constituted by three adjoining loops b forming a composite elongated loop B, but there is further provided a resilient metal plate 6 which holds said loop through side lugs 7a and an end abutment 7b, the latter being provided at the end of plate 6. Plate 6 reinforces the device and improves the electrical qualities of element 1, the resistance of which is reduced by the fact that the electric current from point $B_2$ (contacts between loop B and the engaged conducting surface) travels through loop B both directly from $B_2$ to tube 5 and, indirectly, from $B_2$ to $B_1$ and thence through plate 6 to said tube 5. Plate 6 may also be provided with a downward end step 8 (FIG. 2) or with side lugs 9 (FIG. 3) extending in a direction opposed to that of lugs 7a. Tube 5 may be made either as shown by FIG. 2, several wires 10 being then set in openings 11 of said tube 5, or as shown by FIG. 3, a parallellepiped conductor element 12 (fixed by setting in the right end of said tube 5) then permitting the fixing of electric wires (not shown) to plate 12.

Figure 4:
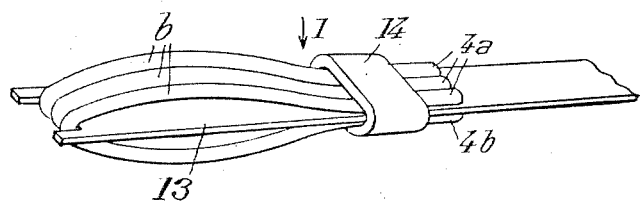
Figure 5:
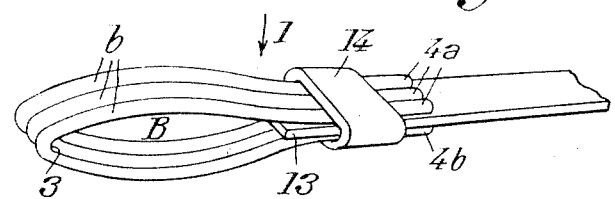

In the electric contacts shown by FIGS. 4 and 5, there is provided a supporting plate 13 made of an electrically conductive metal, on either side of which are disposed the ends 4a and 4b of loops b. Said ends 4a and 4b are tightly applied against plate 13 by means of a ring 14. Plate 13 may be either of restricted dimensions as shown by FIG. 5, or of dimensions sufficiently large to enable it to support loop B as shown in FIG. 4.

Figure 6:
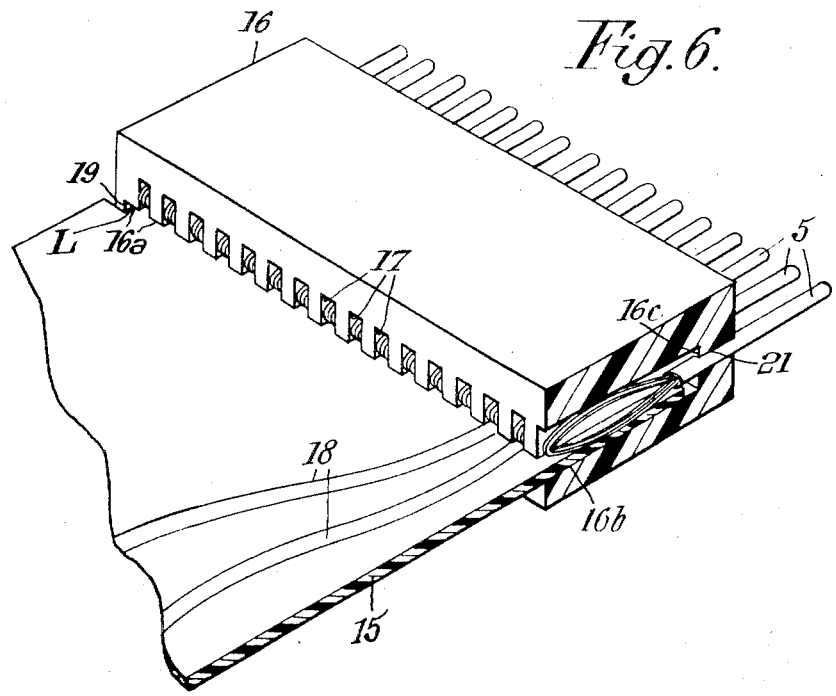
FIG. 6 is a perspective view, partly in section, of a connector provided with electric contacts according to the present invention.

FIG. 6 shows two connected elements, one of these, to wit 15, consisting of a printed circuit board or card, whereas the other element 16 is that which supports the electrical contacts in accordance with the present invention.

Element 16 may be made of a synthetic substance such as for instance, methyl methacrylate molded in the form shown in FIG. 6 to provide therein an elongated housing limited at the top and at the bottom thereof, respectively, by two flat surfaces, to wit a top one 16a and a bottom one 16b.

Into this housing is inserted card 15, the thickness of which is smaller than the height of said housing. Surface 16a is provided with a series of parallel grooves 17 extending in the direction in which board 15 is inserted into elements 16, each of said grooves 17 containing one of the contacts as illustrated, for example, in FIG. 1. The respective dimensions of grooves 17 and elongated loops B are such that said loops B are engaged between faces 16a and 16b whereby, when card 15 is inserted into element 16, said loops are slightly compressed by said card, thus insuring good electric contact with the elements 18 of the printed circuit board. Guiding elements can be provided for correctly positioning card 15 with respect to element 16. In the illustrated example, said guiding elements are constituted by the lateral vertical walls tof the housing (only one of these walls, to wit 19, is visible in the drawings) against which the lateral edges L of the card are applied.

In order to keep the electric contact elements in proper position inside grooves 17, the tubes 5 of these contact elements are supported by the end wall 16 of the housing intended to receive card 15, tubes 5 extending through holes 21 formed in said end wall 16c and the diameter of said holes 21 being such that tubes 5 are held therein with moderate friction. The sliding of each tube 5 in the corresponding hole 21 is limited in one direction by the flattened end of said tube 5 near loop b. Positive stopping may be obtained by providing a second flattening at the outlet of hole 21.

Figure 7:
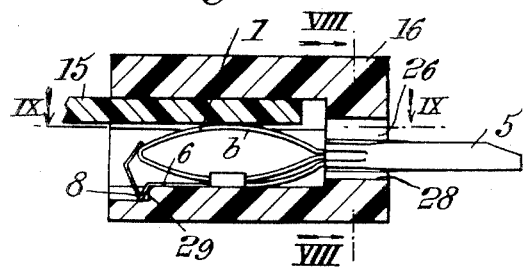
FIG. 7 is a sectional view of the elements of a modified connector similar to the connector of FIG. 6.
Figure 8:
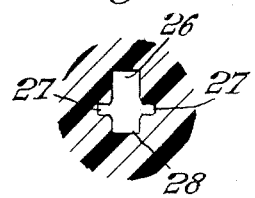
FIG. 8 is a cross-section on line VIII—VIII of FIG. 7.
Figure 9:
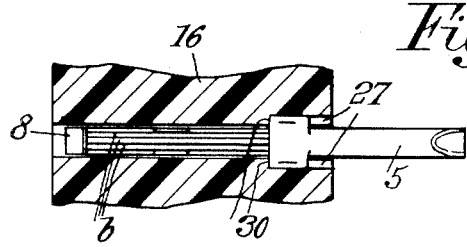
FIG. 9 is a sectional view of line IX—IX of FIG. 7.

The utility of the deformations 8 (FIG. 2) or of lugs 9 (FIG. 3) is clearly seen in FIGS. 7, 8 and 9 which show a modification of the element 16 illustrated in FIG. 6. Whereas, in FIG. 6, the contacts can be fixed permanently in element 16, in the modification of FIGS. 7, 8 and 9, they are removable. For this purpose, each passage 21 comprises a longitudinal groove 26 for the passage of loop B, two longitudinal grooves 27 for the passage of the flattened portion of tube 5 and a longitudinal groove 28 for the passage of plate 6 which is secured, by its step 8, against a shoulder 29 provided in element 16 (FIG. 7). The distance between the end 30 of grooves 27 to shoulder 29 is equal to the length of plate 6 so that element 1 is secured inside of element 16 when step 8 is engaged by shoulder 29. In order to remove element 1, it suffices to disengage step 8 from shoulder 29.

Figure 10:
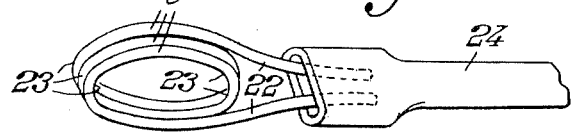
FIG. 10 is a perspective view of still another modification of an electric contact according to the present invention.
Figure 20:
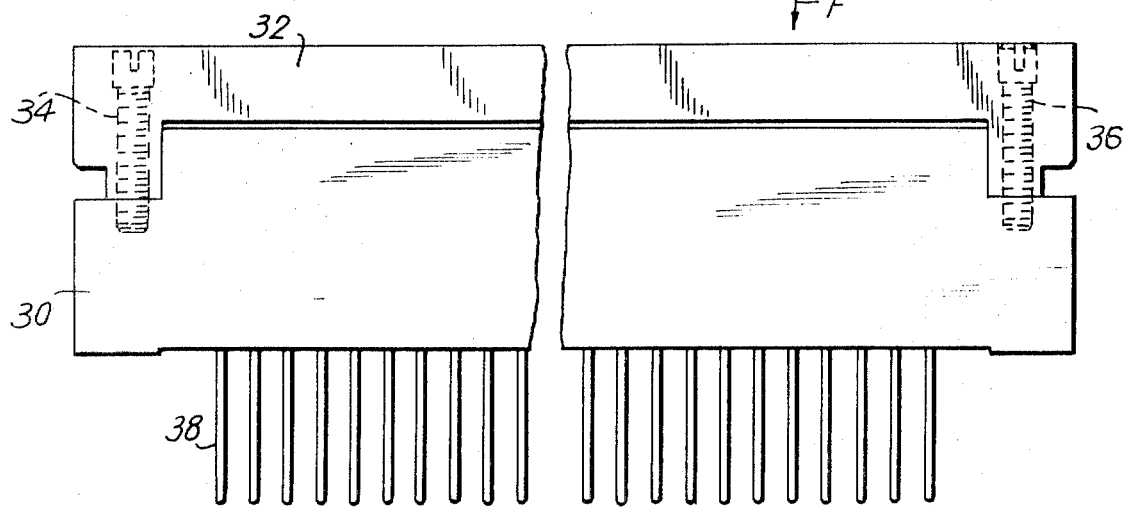
FIG. 20 is a side view, with a central portion omitted, of a contact arrangement provided for a printed circuit board in accordance with the invention.

In the embodiment of the invention illustrated in FIG. 10, use is made of a wire 22 of resilient material which forms several adjoining oval-shaped loops with permanent bends at 23. The ends (shown in dotted lines) of this wire 22 are inserted into a tube 24, it being understood that this tube can be the same as tube 5 of FIGS. 1 to 9. It is also possible to twist the ends of the wires 22 to permit connecting this contact element directly and without intermediate pieces such as tube 24 to an external circuit.

In a second group of embodiments of the invention, illustrated by FIGS. 1 to 9 inclusive, the deformable electric contacts include a loop b of non-symmetrical shape. With such a shape, it is possible to increase the resilient deformability of the loop and to require a smaller depth of penetration by the engaged element.

In these embodiments, the resilient metal wire forming the loop is supported by one of the elements, to wit element 31, of an electrical connector. The engaged element 32 may, for instance, consist of a printed circuit card provided with a conducting surface 33.

Element 31, which may be of a synthetic material such as methyl methacrylate, includes a top wall 31a, a bottom wall 31b and an end wall 31c, the latter being provided with a hole 34 through which passes tube 5. The space between top wall 31a and bottom wall 31b is divided, in the portion thereof adjoining between bottom wall 31b, with vertical partitions 35. Each of the loops b is disposed in a space between two consecutive partitions 25. The height of partitions 35 is such that loops b project above the tops of said partitions and are thus located across the path of travel (illustrated by arrow F) of element 32 when the latter is inserted into element 31. Walls 37 serve to guide element 32 laterally in element 31.

In the construction of FIG. 11, both of the right hand ends of loop b are held in the left hand end of tube 5. The general shape of the loop is such that both sides thereof have their concavity turned toward upper wall 31a, the end portion 38 of the loop bearing against the bottom wall 31b. When element 32 is engaged into element 31, it tends to flatten loop b and the free end 38 of said loop is caused to slide toward the left, along bottom wall 31b.

In the embodiment of FIG. 12, both of the right hand ends of the loop are held in the left hand end of tube 5. Loop b is bent upon itself, forming two branches $b_1$ and $b_2$ disposed one above the other, branch $b_1$ projecting above the top walls of partitions 35. Owing to this arrangement, the transverse flexibility of loop b is considerably increased.

In the embodiment of FIG. 13, the loop is similar in shape to that of FIG. 11, but is turned upside down. Said loop bears by its lower portion upon the bottom wall 31b of connector element 31. The free end 38 of the loop, which is to cooperate with the second contact element 32, is located very close to the inlet of the housing formed in element 31 so that electrical contact can be obtained by a small penetration of element 32 into element 31.

In the embodiment of FIG. 14, the free ends of the metal loop are still held in the same manner in tube 5. The lower branch 39 of said loop is rounded so as to be flattened considerably when the upper branch 40 is pushed by connector element 32.

In the embodiment of FIG. 15, loop $b$ is provided at its left end with an angular bend 41 and at its top and bottom with two angular bends 42 and 43. Bend 43 is above the tops of walls 35. This arrangement is such that electrical contact is obtained with a small penetration of element 32 into the other element 31.

In the embodiment of FIG. 16, the resilient wire which forms loop $b$ is fixed at only one of its ends to tube 5 and its free end 44 bears slidably upon the bottom wall 31$b$ of contact element 31 so that loop $b$ has a great deformability.

The embodiment of FIG. 17 constitutes a modification of that of FIG. 16, and loop $b$ includes supplementary angular bends 45 and 46 which increase deformability.

In the embodiment of FIG. 18, the metal wire forms two consecutive loops $b_1$ and $b_2$. Loop $b_1$, which is of greater size, projects above partitions 35. Loop $b_1$ is deformed resiliently by connector element 32 due to the fact that the two branches of the wire can slide resiliently with respect to each other. In this case electric contact is also obtained with only a small penetration of element 32 into element 31. A second contact may be obtained with loop $b_2$.

In the embodiment of FIG. 19, loop $b$ is in the form of a parallelogram. In this case also, electric contact is insured by a small penetration of contact element 32 into contact element 31, said element 32 coming into contact with the edge 50 of the loop.

The electric contact elements according to the present invention have many advantages and in particular the following:

The contact resistance is constant for a great range of current intensities extending from less than one microampere to several amperes whereby an electric signal passing through the connector is not attenuated.

The wear of the conductive parts of printed circuit cards is reduced to a minimum due to the very great resiliency of the oval loops.

The contacts obtained with the present invention are very reliable because on each of the loops $b$ there are a plurality of contact points.

FIGS. 20–24 show an embodiment of the invention particularly suitable for the accommodation of a planar type of insert, such as a printed circuit board.

This embodiment, as illustrated in FIGS. 20–24, comprises a supporting member 30 atop which is positioned a cover member 32, these two elements being held together by means of threaded members 34 and 36. A plurality of contact structures 38 protrude from the bottom of the support member 30 and constitute the means by which connection can be made with an electrical circuit. The printed circuit board will be inserted from the top, as indicated by the arrow F.

Figure 21:
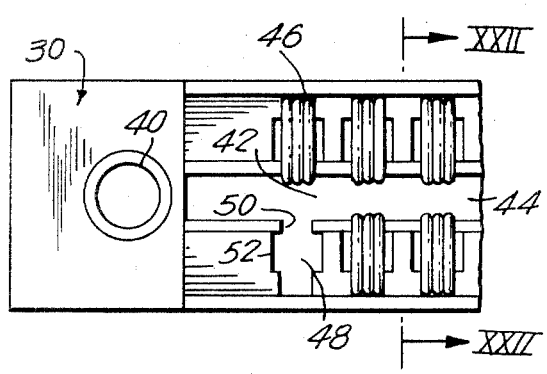
FIG. 21 is a top view of an end portion of the lower element of the arrangement shown in FIG. 20.

A top view of a part of the support member 30 appears in FIG. 21, wherein can be seen the threaded opening 40 which is engaged by the threaded element 34.

In FIG. 21 can be seen a central slot 42, having a bottom 44 against which will abut the inserted printed circuit board. A plurality of contact structures 46 are illustrated which are electrically connected with elements 38 protruding from the bottom of the support member 30. The contact structures 46, as has been indicated above, consist of a plurality of aligned and similar loops which form a composite loop, each of which protrudes into the slot 42 for engagement with the inserted printed circuit board.

The composite loops 46 are accommodated in a receptacle 48 having an opening 50, through which the composite loops laterally extend for engagement with the aforesaid printed circuit board. The openings or receptacles 48 moreover are provided with widened central portions 52 which accommodate the passage of the connecting means connecting the composite loops 46 with their associated extensions 38, as has been described hereinabove. The widening 52 is provided to accommodate the passage of the connecting means upon installation of the contact structures.

Figure 22:
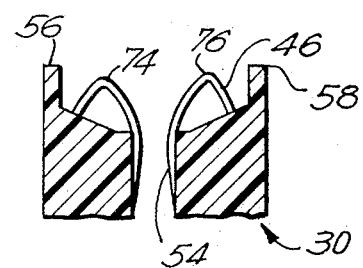
FIG. 22 is a partial sectional view taken along line XXII—XXII of FIG. 21.

FIG. 22 is a sectional view taken along line XXII—XXII of FIG. 21, wherein can be seen the composite loops 46 protruding laterally, as indicated at 54. In FIG. 22 can be seen lateral shoulders 56 and 58.

Figure 23:
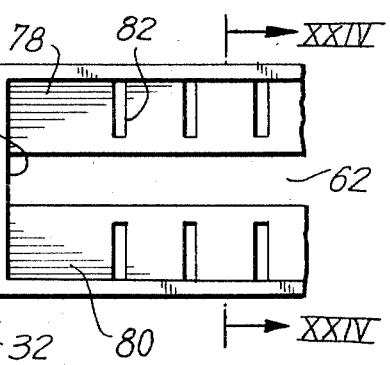
FIG. 23 is a top view of an end portion of the upper element of the arrangement shown in FIG. 20.

A top view of the cover element 32 is seen in FIG. 23, wherein can also be seen the hole 60, through which extends the element 34 for connecting the cover element to the support member 30.

Figure 24:
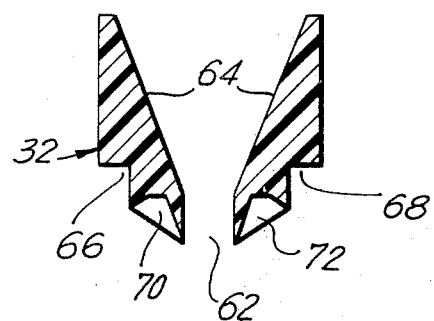
FIG. 24 is a partial sectional view taken along line XXIV—XXIV of FIG. 23.

Cover element 32 is provided with an open central slot 62, through which passes the printed circuit board upon insertion and from FIG. 24 it can be seen that the slot 62 has a tapered entrance 64 serving as a guide for the insertion of said board.

The cover member 32 is provided with shoulders 66 and 68, which respectively seat on the shoulders 56 and 58 of the support member 30. Moreover, there are provided receptacles 70 and 72 which are adapted to receive and accommodate the top end portions 74 and 76 of the respective composite loops, these top end portions being the permanently bent portions referred to hereinabove.

In the inclined sides 78 and 80, which constitute the tapered entrance to the slot 62, are provided a series of further slots 82, these being aligned between the composite loops 46 to provide an indication of where the latter are located. Ends of the printed circuit board inserted through slot 62 may abut against the ends of the slot 62 such as indicated at 84, and if they do not so abut, the slots 82 will form a guide as to the insertion of the printed circuit board.

The composite loops or connector structures are aligned in two parallel and spaced rows, as seen particularly in FIG. 21, and the extensions of the composite loops into the slot 44 as noted hereinabove, provide for engagement with electrical elements on the printed circuit board in such a manner that friction is minimized while affording, nevertheless, an excellent electrical contact.

What is claimed is:

1. An electrical connector comprising at least one contact structure which includes, in combination, a plurality of separate juxtaposed similar elementary loops of an electrically conductive resilient metal wire, said loops being aligned to form a composite loop, said similar loops being elongated in a first direction and having convergent end portions and, further, being widest at a middle portion between said end portions, each elementary loop being resiliently deformable in its own plane in the direction transverse to said first direction, said composite loop likewise having convergent end portions and being widest at a middle portion between said end portions and being resiliently deformable by the resilient deformation of the elementary loops individually, whereby said composite loop is adapted to make resilient contact, at its widest middle portion, with a plane complementary surface parallel to said first direction and perpendicular to the planes of the elementary loops, a conductor, and connecting means, said composite loop being secured at one end portion to said conductor in extension of the latter by said connecting means.

2. A connector according to claim 1, wherein said composite loop is asymmetrical.

3. A connector according to claim 1, wherein each of said similar loops has a permanent bend at one end portion.

4. A connector according to claim 1, wherein said connecting means includes a tube including a flattened end in which one end of the composite loop is set.

5. A connector according to claim 1, wherein said wire is of phosphorous bronze and has a diameter of from 0.05 to 0.4 mm.

6. A connector according to claim 1, wherein said wire is of beryllium copper and has a diameter of from 0.05 to 0.4 mm.

7. A connector according to claim 1, wherein said connecting means includes a tube provided with openings, further comprising wires set in said openings.

8. A connector according to claim 1, wherein said loop consists of a single wire in the form of a plurality of juxtaposed and adjoining spires.

9. A connector as claimed in claim 1, comprising a plurality of said contact structures, support means for holding said structures in two spaced and parallel alignments adapted to receive a printed circuit board therebetween, said structures protruding from said support means in the absence of a printed circuit board, and cover means on said support means generally concealing and shielding said contact structures and provided with a slot for the passage of said board between said alignments.

10. A connector as claimed in claim 9, wherein the support means has a central slot to receive said board and the contact structures are removably supported in said support means which is provided, for each contact structure, with a laterally open receptacle through which the associated structure protrudes into said central slot and a widened central aperture to accommodate passage of said connecting means upon installation of the associated contact structure in the receptacle.

11. A connector as claimed in claim 10, wherein the slot of said cover means has a tapered entrance and said cover means is furthermore provided with a plurality of transverse slots aligned between said contact structures, said cover means including receptacles to accommodate an end portion of each contact structure.

12. A connector as claimed in claim 11 comprising means to lock the cover and support means together to lock in said contact structures.

13. An electrical connector comprising at least one contact structure which includes, in combination, a plurality of separate juxtaposed similar loops of an electrically conductive resilient metal wire, said loops being aligned to form a composite loop, said similar loops being elongated in a first direction and having convergent end portions and, further, being widest at a middle portion between said end portions, said composite loop likewise having convergent end portions and being widest at a middle portion between said end portions, a conductor, and connecting means, said composite loop being secured at one end portion to said conductor in extension of the latter by said connecting means, said connector further comprising a resilient metal plate including side lugs holding said composite loop.

14. An electrical connector comprising at least one contact structure which includes, in combination, a plurality of separate juxtaposed similar loops of an electrically conductive resilient metal wire, said loops being aligned to form a composite loop, said similar loops being elongated in a first direction and having convergent end portions and, further, being widest at a middle portion between said end portions, said composite loop likewise having convergent end portions and, further, being widest at a middle portion between said end portions, a conductor, and connecting means, said composite loop being secured at one end portion to said conductor in extension of the latter by said connecting means, said connector further comprising a resilient metal plate including an end abutment holding said composite loop.

15. For use in an electrical connector including two cooperating elements, a first one and a second one, adapted separately to engage each other through respective electricity conducting contacts thereof, a contact structure for said first connector element which comprises, in combination, a plurality of separate juxtaposed similar elementary loops, each comprising an electricity conducting resilient metal wire, said elementary loops adjoining each other so as to form a composite loop, said elementary loops being elongated in the direction in which they are to engage the electricity conducting contact of the second connector element, said elementary loops having convergent leading and trailing portions with respect to said direction and being widest in a middle portion between said leading and trailing portions, said elementary loops being aligned so that said composite loop likewise has convergent leading and trailing portions with respect to said direction and is widest in a middle portion between said leading and trailing portions, said composite loop being secured at its trailing portion to said first connector element by connecting means carried by said first connector element, and resilient means holding said elementary loops together to reinforce said composite loop.

16. A contact structure according to claim 15, wherein said composite loop is asymmetrical.

17. A contact structure according to claim 15, wherein each of said elementary loops is permanently bent in its middle part in the form of two V's opening towards each other.

18. A contact structure according to claim 15, wherein said connecting means consists of a tube having a flattened end in which said trailing portion of the loop is set.

19. A contact structure according to claim 15, wherein said wire is made of phosphorous bronze and has a diameter ranging from 0.05 to 0.4 mm.

20. A contact structure according to claim 15, wherein said wire is made of beryllium copper and has a diameter ranging from 0.05 to 0.4 mm.

21. A contact structure according to claim 15, wherein said resilient means comprises a resilient metal plate provided with side lugs for holding said composite loop.

22. A contact structure according to claim 15, wherein said resilient means comprises a resilient metal plate provided with an end abutment for holding said composite loop.

23. A contact structure according to claim 15, wherein said connecting means consists of a tube provided with several openings in the form of eyelets, further comprising electric wires set in said openings respectively.

24. A contact structure according to claim 21, in which said plate is disposed perpendicular to the planes of said elementary loops and contacts said elementary loops at least when the two connector elements are interengaged, said side lugs extending substantially at right angles to said plate to the level of at least part of said composite loop, there being at least one side lug on each side of said composite loop.

25. A contact structure according to claim 22, in which said plate is disposed perpendicular to the planes of said elementary loops and contacts said elementary loops at least when the two connector elements are interengaged, said end abutment being formed at a region of said plate in the vicinity of said leading portion of said composite loop, and said end abutment passing around said leading portion and extending rearwardly to overlap said leading portion on the side of said composite loop opposite to the side on which said plate is located.

26. For use in an electrical connector including two cooperating elements, a first one and a second one, adapted separately to engage each other through respective electricity conducting contacts thereof, a contact structure for said first connector element which comprises, in combination, a plurality of separate juxtaposed similar elementary loops, each comprising an electricity conducting resilient metal wire, said elementary loops adjoining each other so as to form a composite loop, said elementary loops being elongated in the direction in which they are to engage the electricity conducting contact of the second connector element, said elementary loops having convergent leading and trailing portions with respect to said direction and being widest in the middle portion between said leading and trailing portions, said elementary loops being aligned so that said composite loop likewise has convergent leading and trailing portions with respect to said direction and is widest in a middle portion between said leading and trailing portions, said composite loop being secured at its trailing portion to said first connector element by connecting means carried by said first connector element, and means holding said elementary loops together.

27. A connector as claimed in claim 26 further comprising an elongated housing provided with a central slot limited by spaced flat surfaces and having spaced parallel grooves opening on one of said surfaces, composite loops being positioned in said grooves.

References Cited

UNITED STATES PATENTS

| | | | |
|---|---|---|---|
| 1,894,327 | 1/1933 | Schellenger | 339—276 |
| 2,106,724 | 2/1938 | Cope | 339—247 |
| 2,398,504 | 4/1946 | Pavelka | 339—276 |
| 2,486,115 | 10/1949 | Chiuchiolo | 339—276 X |
| 2,729,695 | 1/1956 | Pierce | 339—276 X |
| 3,123,427 | 3/1964 | Yopp | 339—252 |
| 3,289,148 | 11/1966 | Antes | 339—258 |
| 3,317,888 | 5/1967 | Mancini | 339—276 X |
| 3,329,926 | 7/1967 | Aksu et al. | 339—176 |

FOREIGN PATENTS

| | | |
|---|---|---|
| 39,706 | 11/1931 | France. |
| 658,910 | 4/1938 | Germany. |
| 275,226 | 12/1927 | Great Britain. |
| 158,077 | 3/1957 | Sweden. |
| 227,243 | 8/1943 | Switzerland. |

DAVID J. WILLIAMOWSKY, Primary Examiner

P. C. KANNAN, Assistant Examiner

U.S. Cl. X.R.

339—252, 256